Feb. 22, 1944.    R. B. CAMPBELL    2,342,450
SELECTOR VALVE WITH AUTOMATIC RETURN
Filed Dec. 12, 1941    2 Sheets-Sheet 1
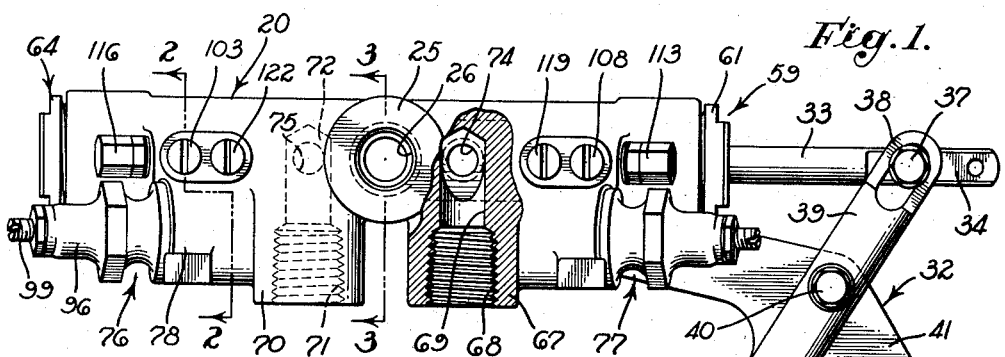
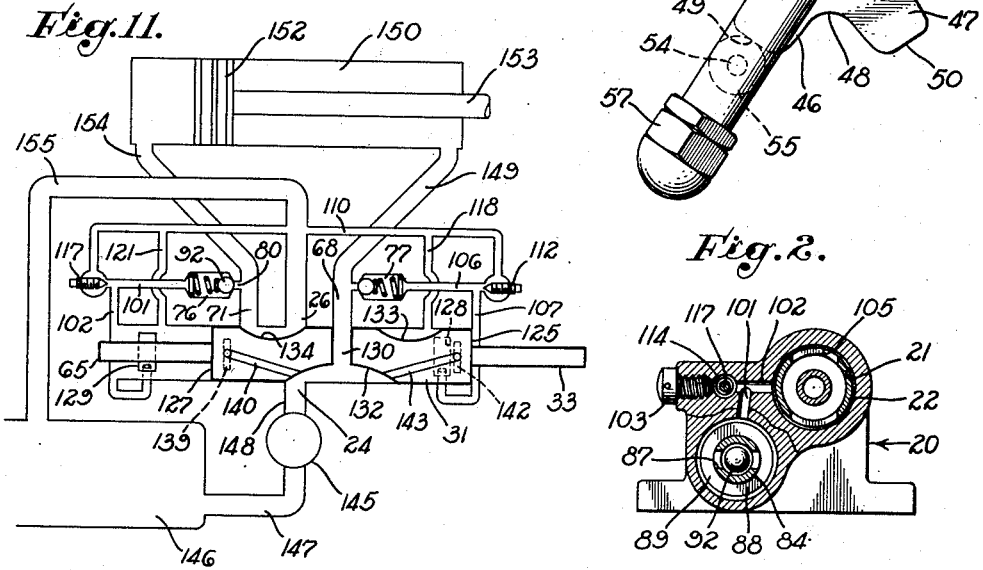
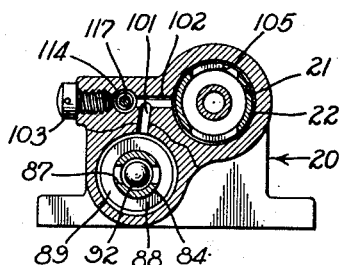
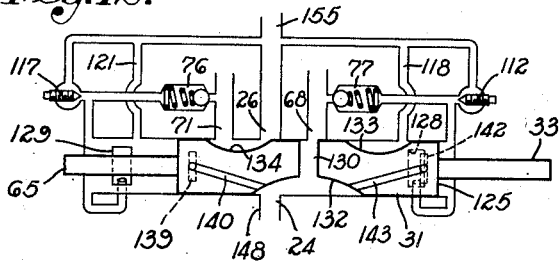
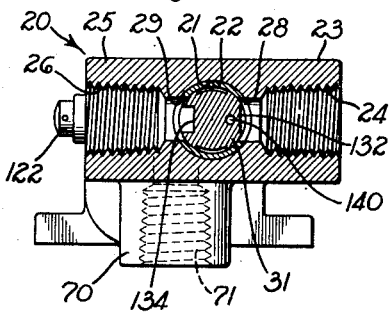
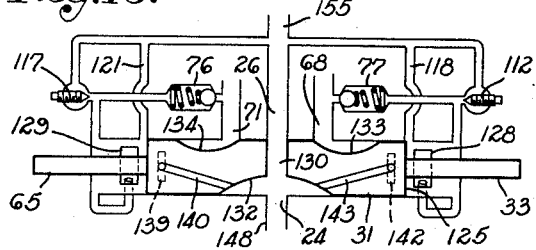
INVENTOR
RODNEY B. CAMPBELL
BY HARRIS, KIECH, FOSTER & HARRIS
FOR THE FIRM
ATTORNEYS.

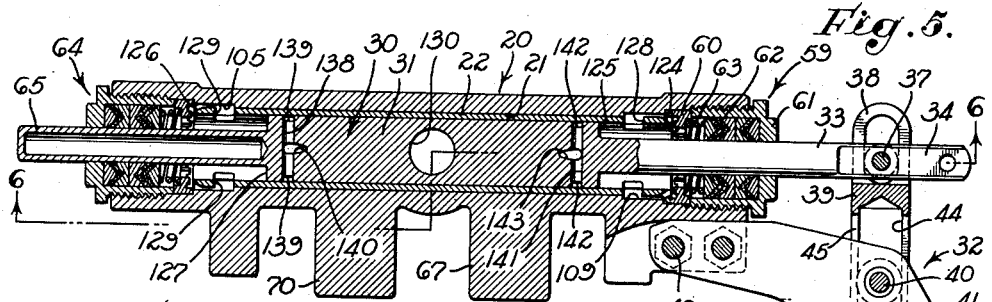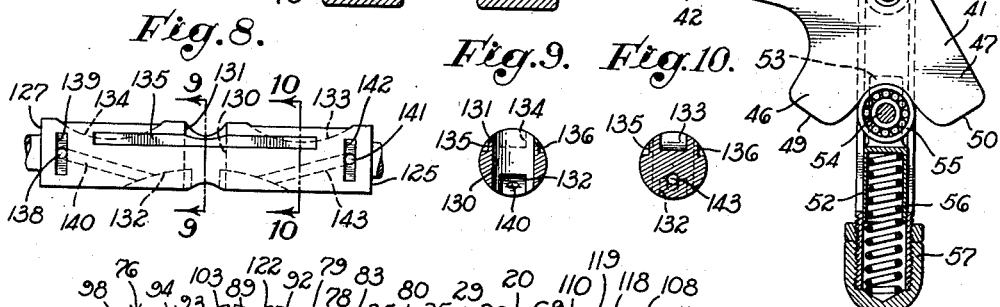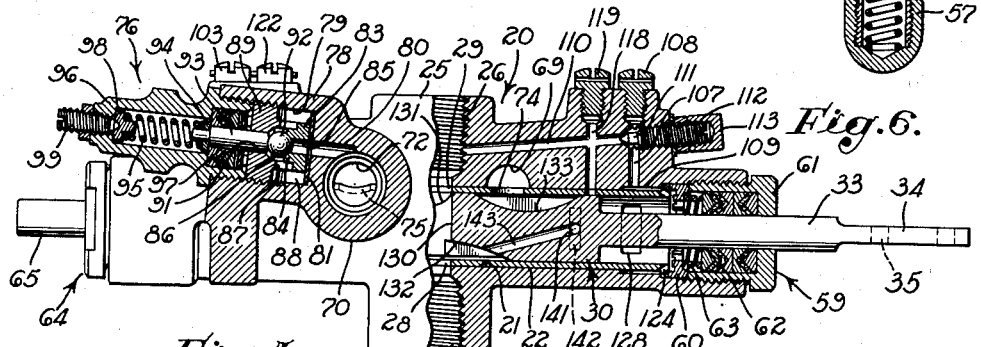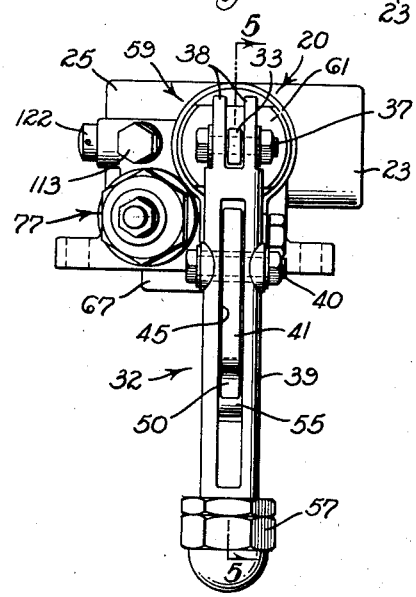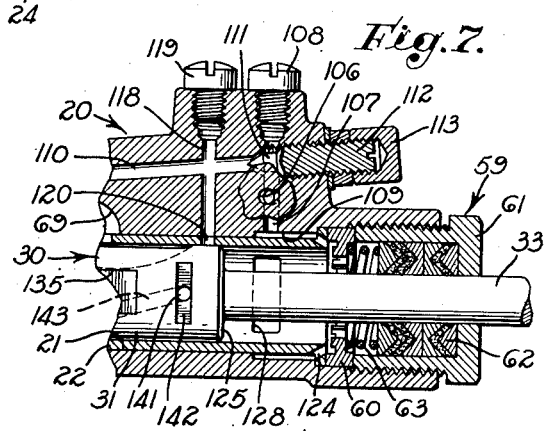

Patented Feb. 22, 1944

2,342,450

UNITED STATES PATENT OFFICE 2,342,450

SELECTOR VALVE WITH AUTOMATIC RETURN

Rodney B. Campbell, North Hollywood, Calif., assignor to John Eley, Jr., Los Angeles, Calif.

Application December 12, 1941, Serial No. 422,665

13 Claims. (Cl. 137—144)

My invention relates to the fluid valve art and more particularly to a selector valve device.

The invention is of particular utility in hydraulic control systems for aircraft and will be described in connection therewith, although it is to be understood that the invention has other uses and I do not desire to be limited to the specific use described.

Hydraulic control systems are now widely used on aircraft for operating and controlling the operation of many of the devices on an airplane. For example, such fluid control systems are commonly used to raise and lower the aircraft landing gear, wing flaps, tail wheels, and other operating units of the airplane. It is standard practice to accomplish these results with such a hydraulic system by alternately admitting the operating fluid from the system into opposite ends of an actuating cylinder having a piston therein which is connected by a suitable piston rod to the device to be mechanically moved, such as the landing gear. Thus, when operating fluid is admitted to one end of the actuating cylinder, the landing gear is raised to retracted position, and when fluid is admitted to the other end of the actuating cylinder, the landing gear is lowered from retracted to extended position. Of course, when one end of the actuating cylinder is opened to the operating fluid, which is normally under relatively high pressure (usually in the neighborhood of 1000 pounds per square inch), the other end of the cylinder must be opened to discharge, and vice versa. To accomplish this selective admittance of operating fluid from the hydraulic system to the actuating cylinder, it is customary to use a selector valve device, of which there are many types available in the art.

I prefer to use such a selector valve device in connection with an actuating cylinder having a piston therein, the selector valve including a movable valve member which can be selectively adjusted to either of three positions, i. e.: (a) a first operating position in which one end of the actuating cylinder is connected to the hydraulic supply system and the other end is connected to low pressure discharge: (b) a second operating position in which the fluid connections to the actuating cylinder are reversed; and (c) a third, or neutral, position in which the fluid supply ports to the actuating cylinder are closed and the operating fluid merely circulates from the high pressure side to the low pressure side of the system through the selector valve. I also prefer to use a selector valve device of such type which will always automatically return to its neutral position at the conclusion of movement of the actuating cylinder piston in either direction. This is accomplished by utilizing the natural rise in fluid pressure in the supply line upon completion of a stroke of the actuating cylinder piston to return the valve to its neutral position.

Such a selector valve device ordinarily is provided with a movable valve member which is movable from either of its operating positions toward its neutral position by the application of operating fluid under pressure to the ends of the valve member. There is a common tendency in such devices, however, for the valve member to stop between an operating position and its neutral position because of so-called "knifing" of the flow through the main ports of the valve member. Consequently, it is a primary object of my present invention to overcome this tendency by introducing an additional charge of operating fluid under increased pressure to the end of the valve member during its travel from an operating position to its neutral position, to accelerate its movement as the main valve ports are closed.

Other objects and advantages of the invention will appear from the following specification and the drawings, which are for the purpose of illustration only, and in which:

Fig. 1 is an elevational view of the invention, partly in section.

Fig. 2 is a cross-sectional view taken on the line 2—2 of Fig. 1.

Fig. 3 is a cross-sectional view taken on the line 3—3 of Fig. 1.

Fig. 4 is an end view of the device taken from the right-hand end of Fig. 1.

Fig. 5 is a vertical sectional view taken on the line 5—5 of Fig. 4.

Fig. 6 is a horizontal sectional view taken on the line 6—6 of Fig. 5.

Fig. 7 is an enlarged sectional view of the right-hand end of Fig. 6.

Fig. 8 is an elevational view of the valve piston of my invention.

Fig. 9 is a cross-sectional view taken on the line 9—9 of Fig. 8.

Fig. 10 is a cross-sectional view taken on the line 10—10 of Fig. 8.

Fig. 11 is a diagrammatic view of my invention showing it installed in a preferred hydraulic system and in a first operating position.

Fig. 12 is a view similar to Fig. 11 but showing merely the invention in an intermediate position of operation.

Fig. 13 is a view similar to Fig. 11 but illustrating my device in its neutral position.

Referring to the drawings, I show a main housing 20 having a longitudinal bore 21 therein in which is disposed a bushing sleeve 22, which is preferably hardened to resist wear. Formed on the main housing, and preferably diametrically disposed, is an inlet boss 23 having a threaded inlet port 24 therein and a discharge boss 25 having a discharge port 26 therein. The bushing sleeve 22 is provided with an inlet opening 28 which registers with the inlet port 24, and is provided with a discharge opening 29 which registers with the discharge port 26.

Disposed in the bushing sleeve 22 is a valve means 30 which includes a piston valve member 31 axially movable in the bushing sleeve. Connected to the rightward end of the piston valve member 31, as seen in the drawings, is a valve actuating means 32, which includes an actuating rod 33, one end of which is rigidly connected to the piston valve member 31, and the other end of which extends out of the main housing 20 and is provided with a flat end portion 34 having a horizontal hole 35 drilled therein. Pivotally connected to the flat end portion 34 of the actuating rod 33, as by a pivot pin 37 passing through clevis arms 38 thereof, is an actuating lever 39 which in turn is pivotally mounted as by a pivot pin 40 to a plate member 41 secured, as by suitable bolts 42, to the main housing 20. As best shown in Fig. 5, the actuating lever 39 is tubular in form and is provided with a cylindrical bore 44 having a slot 45 therethrough through which extends the plate member 41. As best shown in Figs. 1 and 5, the outer end of the plate member 41 is substantially Y-shaped, being provided with legs 46 and 47 separated by an arcuate valley 48 and being provided on their ends with flat, angularly disposed faces 49 and 50, respectively. Slidably mounted in the lower end of the actuating lever 39 is a cup-shaped sleeve 52, the upper end of which is provided with clevis arms 53 between which is pivoted, as by a cross pin 54, a cam roller 55, which is supported on suitable ball bearings on the cross pin. The cam roller 55 is normally held in pressure engagement with the end of the plate member 41 by a spring 56, one end of which engages the cup-shaped sleeve 52, and the other end of which engages the inner end of a plug 57 suitably threaded onto the lower end of the tubular actuating lever 39.

Closing the right-hand end of the longitudinal bore 21 of the housing 20 is a closure member 59 which includes a spacer ring 60 of annular form held in engagement with the right-hand end of the bushing sleeve 22 by a packing gland 61 which is threaded into the right-hand end of the longitudinal bore 21. Retained within the packing gland 61 is an annular chevron packing member 62 which surrounds the actuating rod 33 and forms a fluid-tight seal between the packing gland 61 and the rod 33, the chevron packing member being held in sealing relation by a spring 63 which engages the same and which also engages the spacer ring 60. The left-hand end of the longitudinal bore 21 is similarly closed by a closure means 64 which is in all respects identical with the closure means 59 and forms a seal with a balancing rod 65 rigidly connected to the other or leftward end of the piston valve member 31. The balancing rod 65 is provided so that the pressure areas of the opposite ends of the piston valve member 31 are equal, so as to provide a piston having hydraulically balanced ends.

As best shown in Fig. 1, the main housing 20 is provided with a boss 67 having a threaded first supply port 68 formed therein which is provided with an inner smaller bore 69 which extends upwardly into the main housing 20. Similarly provided on the main housing 20 is a boss 70, which is longitudinally aligned with the boss 67, and which is provided with a threaded second supply port 71 having an upwardly extending inner bore 72 similar to the inner bore 69. As will be noted, the inner bore 69 communicates with the interior of the bushing sleeve 22 through a radial port 74 formed in the bushing sleeve, and the inner bore 72 similarly communicates with the interior of the bushing sleeve through a radial port 75 formed therein, as best shown in Fig. 6.

As best shown in Fig. 1, the main housing 20 is provided at its leftward side with a first auxiliary valve means 76 and at its rightward side with a second auxiliary valve means 77, which are in all respects identical, and consequently only the first auxiliary valve means 76 will be described in detail, it being shown in Fig. 6. The first auxiliary valve means 76 includes a boss 78 formed on the housing 20, which is provided with a central bore 79, the outer end of which is suitably internally threaded. Axially aligned with the bore 79 and communicating with the inner bore 72 of the second supply port 71 is a drilled hole 80. Provided in the inner end of the bore 79 is an annular spacer washer 81 which is engaged by the inner end of a valve seat cage 83 which is provided with an annular valve seat 84 having a central valve opening 85 therein which communicates with a drilled hole 80. The outer end of the valve seat cage 83 is provided with a central chamber 86 which communicates through radial ports 87 with an annular space 88 surrounding the valve seat cage. The valve seat cage 83 is held in place in the bore 79 by a valve guide ring 89 threaded into the outer end of the bore 79 and having an axial opening 91 therein which is axially aligned with the annular valve seat 84. Disposed in the central chamber 86 is a ball valve element 92 which is adapted to seat on the annular valve seat 84 to close the valve opening 85. The ball valve element 92 is normally held in seated position on the annular valve seat 84 by a stem member 93 projecting through the axial opening 91 into engagement with the ball valve element and provided on its outer end with an engaging ring 94 engaged by a compression spring 95 retained in a cup-shaped retaining plug 96 which is threaded into the outer end of the bore 79 and into retaining engagement with the valve guide ring 89. Disposed around the stem member 93 is an annular chevron packing member 97 which prevents fluid leakage along the stem member 93. The outer end of the compression spring 95 engages an engaging head 98, the outer face of which is engaged by an adjustment screw 99 threaded into the outer end of the cup-shaped retaining plug 96. As will be understood, rotation of the adjustment screw 99 can be used to vary the tension of the compression spring 95, as desired.

As shown in Fig. 2, the annular space 88 of the first auxiliary valve means 76 communicates through a passage 101 with a drilled opening 102, the outer end of which is closed by a threaded machine screw 103 and the inner end of which intersects a counterbore 105 formed at the leftward end of the longitudinal bore 21. The second auxiliary valve means 77 is similarly connected by means of a passage 106, similar to the passage 101, with a drilled opening 107, similar to the drilled opening 102, the outer end of the drilled opening 107 being provided with a threaded machine screw 108, similar to the screw 103, and the inner end of the opening 107 communicating with a counterbore 109 formed at the rightward end of the longitudinal bore 21. As shown in Figs. 6 and 7, a bleeder passage 110 communicates between the discharge port 26 and the drilled opening 107. Adapted to project into the bleeder passage 110 is a head 111 formed on the inner end of a bleeder screw 112 which is threaded into the main housing 20, the bleeder screw being provided with a dust cap 113 at its outer end which also acts as a lock nut to maintain the bleeder screw in a desired adjusted position. The first auxiliary valve means 76 is similarly provided with a bleeder passage 114 which communicates between the drilled opening 102 and the discharge port 26, and has projecting thereinto a bleeder screw 117 similar to the bleeder screw 112, the inner end 115 of which can be seen in Fig. 2, the outer end of which is suitably covered by a dust cap 116 similar to the dust cap 113. Also communicating between the bleeder passage 110 and the longitudinal bore 21 is a drilled passage 118, the outer end of which is closed by a machine screw 119 and the inner end of which registers with a port 120 formed in the bushing sleeve 22. The first auxiliary valve means 76 is provided with a similar drilled passage 121, shown only in Figs. 11 to 13, the outer end of which is closed by a machine screw 122.

As best shown in Figs. 5 and 7, the counterbore 109 communicates with the interior of the bushing sleeve 22 through angled ports 124 in the end thereof so as to provide fluid communication between the counterbore and the interior off the right-hand end of the bushing sleeve 22. Similarly, the counterbore 105 at the leftward end of the longitudinal bore 21 is connected through an annular port 126 formed at the leftward end of the bushing sleeve 22 with the interior of the left-hand end thereof and so as to afford fluid communication between the counterbore 105 and the left-hand end 127 of the piston valve member 31. The counterbore 109 also communicates with the interior of the bushing sleeve 22 through arcuate slots 128 formed therein, and the counterbore 105 also communicates with the interior of the bushing sleeve through arcuate slots 129 formed therein.

The piston valve member 31, best shown in Figs. 5, 6, and 8, includes a main flow passage 130 which is centrally located in the valve member so that when the valve member is in an intermediate or neutral position the main flow passage is substantially axially aligned with the inlet and discharge ports 24 and 26, respectively. Formed in one side of the piston valve member 31 and intersecting the main flow passage 130 is a central arcuate groove 132. Formed in the opposite side of the valve member 31 and diametrically opposed to the central arcuate groove 132 are aligned offset arcuate grooves 133 and 134 respectively, neither of which communicates directly with the main flow passage 130. Formed on the piston valve member 31 on each side of the grooves 133 and 134, and on the opposite side of the piston member from the central arcuate groove 132, are balancing channels 135 and 136 which communicate with the discharge end of the main passage 130 through a cut-away space 131 formed in the piston member 31. The areas of the balancing channels 135 and 136 are so designed that when fluid under pressure is admitted thereto from the main flow passage 130, the pressure exerted thereby on the piston valve member 31 will be substantially equal and opposite to the pressure exerted by such fluid in the central arcuate groove 132, thus preventing the piston valve member from binding in the bushing sleeve 22. Formed in the leftward end of the piston valve member 31 is a first transverse passage 138 which communicates at its ends with relief spaces 139 in the opposite sides of the piston valve member, and which communicates through an oblique passage 140 with the central arcuate groove 132.

Similarly, formed in the rightward end of the piston valve member 31 is a second transverse passage 141 which communicates at its ends with relief spaces 142 diametrically formed in the sides of the piston valve member, and which communicates through an angled passage 143 with the central arcuate groove 132.

Referring to Fig. 11, I show the main housing 20 connected into a fluid pressure system, which is diagrammatically illustrated. This fluid pressure system includes a high pressure pump 145, of any suitable type well known in the art, which draws operating fluid from a reservoir 146, normally retained at relatively low pressure, through a pipe 147, and pumps it through an inlet pipe 148 which is suitably threaded into the inlet port 24 of the main housing 20. Threaded into the first supply port 68 is a pipe 149 which communicates with one end of a fluid cylinder 150 having a sliding piston 152 therein to which is connected a piston rod 153 which extends out of the fluid cylinder and which may be attached to any device desired to be operated thereby. As will be understood, the fluid cylinder 150 may be of any type well known in the art. The other end of the fluid cylinder 150 is connected by a pipe 154 into the second supply port 71 into which it is threaded. Threadedly connected into the discharge port 26 is a discharge pipe 155 which leads back to the reservoir 146.

The operation of the device will be best understood by referring to the diagrammatic Figs. 11, 12 and 13. In operation, the piston valve member 31 is normally in a central or neutral position, in which it is shown in Figs. 5, 6 and 13. As best shown in Fig. 13, in this neutral position operating fluid pumped through the pipe 148 by the high pressure pump 145 enters the main housing 20 through the inlet port 24 and passes through the central arcuate groove 132 and the main flow passage 130 directly through the piston valve member 31 and through the discharge port 26 into the discharge pipe 155 and is conveyed therethrough back into the reservoir 146. As will be noted, in this neutral position the valve actuating means 32 is in the central or neutral position shown in Fig. 5. Operating fluid thus continues to circulate freely through the selector valve until the piston valve member 31 is moved as described hereinafter.

When it is desired to move the fluid piston 152 to the right in the fluid cylinder 150, the actuating lever 39 of the valve actuating means 32 is moved to the left so as to rotate it in a clockwise direction about the pivot pin 40 from the position shown in Fig. 5 to the position shown in Fig. 1. As the actuating lever 39 is thus rotated in a clockwise direction about the pivot pin 40, the cam roller 55 rides from the arcuate valley 48 of the plate member 41 down the inner side of the leg 46 thereof and onto the face 49 formed on the lower end of the leg 46, thus compressing the spring 56. Such clockwise rotation of the actuating lever 39 causes the actuating rod 33 connected thereto to move to the right to the position shown in Fig. 1, moving with it the piston valve member 31 to the position shown in Fig. 11, which may be referred to as a first operating position.

In the first operating position of the piston valve member 31, as shown in Fig. 11, the main flow passage 130 of the piston valve member registers with the first supply port 68, having moved out of registry with the discharge port 26, and, since the central arcuate groove 132 remains at all times in registry with the inlet port 24, operating fluid under pressure flows from the pressure pump 145 through the central arcuate groove 132 and the main flow passage 130 and outwardly through the first supply port 68 and the pipe 149 to the right-hand end of the fluid cylinder 150. In this position of operation, as will be noted from Fig. 11, the second supply port 71 is connected through the offset arcuate groove 133 with the discharge port 26. Consequently, operating fluid under high pressure in the right-hand end of the fluid cylinder 150 causes the fluid piston 152 therein to move to the left, carrying with it the piston rod 153, and any fluid ahead of the fluid piston in the fluid cylinder is forced out therefrom through the pipe 154 and carried back to the reservoir 146 through the arcuate groove 134, the discharge port 26, and the pipe 155. When the fluid piston 152 reaches the left-hand end of its stroke in the fluid cylinder 150, it can travel no farther and stops. When this occurs, the fluid pressure in the right-hand end of the fluid cylinder back of the fluid piston rises, approaching the pressure of the operating fluid supplied by the pressure pump 145.

As will be noted, the second auxiliary valve means 77 communicates directly with the first supply port 68 through the inner bore 69 and the second auxiliary valve means 77, which is in all respects identical with the first auxiliary valve means 76, opens to permit operating fluid under pressure to pass from the supply port 68 through the second auxiliary valve means 77 and the passages 106 and 107 into the counterbore 109 at the rightward end of the bushing sleeve 22, from whence the operating fluid under pressure flows through the angled ports 124 to the right-hand end 125 of the piston valve member 31, to exert a fluid pressure thereon. As best shown in Fig. 11, the left-hand end 127 of the piston valve member 31 is open to discharge pressure through the drilled passage 121 and the discharge port 26. Consequently, when high pressure operating fluid flows as described to the right-hand end of the piston valve member 31, the piston valve member moves to the left from the position shown in Fig. 11 toward the neutral position shown in Fig. 13.

It is to be noted that when the piston valve member 31 is in its first operating position, as shown in Fig. 11, the relief spaces 142 in the side of the piston valve member are out of registry with the arcuate slots 128, although the relief spaces 142 are filled with operating fluid under inlet pressure supplied through the second transverse passage 141 and the angled passage 143 from the central arcuate groove 132. Thus, when the piston valve member 31 has moved to the left from the position shown in Fig. 11 to the postion shown in Fig. 12 by reason of the force exerted on the right-hand end 125 thereof by operating fluid, the relief spaces 142 register with the arcuate slots 128 formed in the bushing sleeve 22. This permits a direct flow of operating fluid under substantially inlet pressure from the central arcuate groove 132 through the angled passage 143 and the relief spaces 142, through the arcuate slots 128, the counterbore 109, and the angled ports 124 to the right-hand end 125 of the piston valve member 31. When the piston valve member 31 starts to move from the position shown in Fig. 11 toward the position shown in Fig. 13, this movement is relatively slow due to the pressure drop in the second auxiliary valve means and associated passages. However, as soon as the relief spaces 142 in the sides of the piston valve member 31 register with the arcuate slots 128 to provide a more direct flow of operating fluid to the right-hand end 125 of the piston valve member, the leftward rate of movement of the piston valve member is accelerated by this additional inlet of high pressure operating fluid to the right-hand end thereof. It is also to be noted that this direct communication between the central arcuate groove 132 and the rightward end 125 of the piston valve member 31 through the angled passage 143 occurs just prior to the time when the main flow passage 130 moves out of registry with the first supply port 68. This insures a full and steady supply of operating fluid under substantial pressure to the right-hand end 125 of the piston valve member 31 during its entire movement from the first operating position shown in Fig. 11 to the neutral position shown in Fig. 13, and hence prevents so-called "knifing" of the fluid flow from the main flow passage 130 to the first supply port 68 as fluid communication is shut off therebetween, and this is an important feature of my invention.

It is also to be noted that leftward movement of the piston valve member 31 causes a similar movement of the actuating rod 33, which in turn rotates the actuating lever 39 in a counterclockwise direction about its pivot pin 40. This causes the cam roller 55 to approach the curved side of the leg 46 leading into the arcuate valley 48 of the plate member 41, and at approximately the same time that the relief spaces 142 of the piston valve member 31 register with the arcuate slots 128 of the sleeve bushing 22 the cam roller moves off the flat face 49 of the leg 46 of the plate member 41 toward the bottom of the arcuate valley 48 formed therein. As soon as this occurs, the spring 56 forces the cam roller 55 upwardly along the leg 46 to exert a relatively strong cam action accelerating the leftward movement of the actuating rod 33 and consequently the piston valve member 31. This increases the acceleration of the piston valve member 31 in its left-ward movement and, together with the increased flow of high pressure operating fluid through the angled passage 143 to the rightward end 125 of the piston valve member 31, snaps the piston valve member through the remainder of its leftward movement to the central or neutral position shown in Fig. 13. As the piston valve member 31 approaches the neutral position shown in Fig. 13, the main flow passage 130 registers with the discharge port 26 to resume free circulation of operating fluid through the selector valve from the pressure pump 145 to the reservoir 146. When the cam roller 55 of the valve actuating means 32 seats in the arcuate valley 48 of the plate member 41, the counterclockwise rotation of the actuating lever 39 stops by the tension of the spring 56, and the piston valve 31 is retained thereby in the neutral position shown in Fig. 13.

When it is desired to move the fluid piston 152 from the left-hand end to the right-hand end of the fluid cylinder 150, the actuating lever 39 of the actuating means 32 is rotated on the pivot pin 40 in a counterclockwise direction until the cam roller 55 indexes on the flat face 50 of the leg 47 of the plate member 41, at which time the piston valve member 31 is moved to the extreme left to a second operating position in which fluid can flow therethrough to the second support port 71 and consequently to the left-hand end of the fluid cylinder 150.

The operation of the device when in the second operating position is identical with that described for the first operating position except that the flow of operating fluid to the cylinder 150 is through the passages and ports formed in the left half of the main housing 20 and the piston valve member 31, as will be well understood by those skilled in the art.

The automatic return from the second operating position to the neutral position is identical with that described in connection with the return from the first operating position to the neutral position, except reversed in direction.

Although I have shown and described a preferred embodiment of my invention, it will be understood that certain parts and elements thereof may be replaced by other parts having the same function and mode of operation without departing from the spirit of the invention, and, consequently, I do not intend to be limited to the embodiment disclosed but desire to be afforded the full scope of the following claims.

I claim as my invention:

1. In a valve device for a hydraulic system, the combination of: a valve housing; inlet port means in said housing adapted to be connected to a source of fluid under relatively high pressure; discharge port means in said housing adapted to be connected to a point of discharge at relatively low pressure; a supply port in said housing; movable valve means in said housing which is movable to a neutral position in which said inlet port is connected to said discharge port, or to an operating position in which said supply port is connected to said inlet port; means for moving said valve means from said neutral position to said operating position; means for automatically returning said valve means from said operating position to said neutral position upon a predetermined rise in fluid pressure in said supply port; and hydraulic means operatively connected to said valve means for accelerating its rate of movement from said operating position to said neutral position.

2. In a valve device for a hydraulic system, the combination of: a valve housing; inlet port means in said housing adapted to be connected to a source of fluid under relatively high pressure; discharge port means in said housing adapted to be connected to a point of discharge at relatively low pressure; a first supply port in said housing; a second supply port in said housing; movable valve means in said housing which is movable to a neutral position in which said inlet port is connected to said discharge port, or to a first operating position in which said first supply port is connected to said inlet port, or to a second operating position in which said second supply port is connected to said inlet port; means for moving said valve means from said neutral position to either said first or second operating positions; means for automatically returning said valve means from said first operating position to said neutral position upon a predetermined rise in fluid pressure in said first supply port, and from said second operating position to said neutral position upon a predetermined rise in fluid pressure in said second supply port; and hydraulic means operatively connected to said valve means for accelerating its rate of movement from either of said operating positions to said neutral position.

3. In a valve device for a hydraulic system, the combination of: a valve housing; inlet port means in said housing adapted to be connected to a source of fluid under relatively high pressure; discharge port means in said housing adapted to be connected to a point of discharge at relatively low pressure; a supply port in said housing; movable valve means in said housing which is movable to a neutral position in which said inlet port is connected to said discharge port, or to an operating position in which said supply port is connected to said inlet port; means for moving said valve means from said neutral position to said operating position; hydraulic means for automatically starting the return of said valve means from said operating position to said neutral position upon a predetermined rise in fluid pressure in said supply port; and supplementary hydraulic means operatively connected to said valve means for accelerating said movement of said valve means from said operating position to said neutral position.

4. In a valve device for a hydraulic system, the combination of: a valve housing; inlet port means in said housing adapted to be connected to a source of fluid under relatively high pressure; discharge port means in said housing adapted to be connected to a point of discharge at relatively low pressure; a first supply port in said housing; a second supply port in said housing; movable valve means in said housing which is movable to a neutral position in which said inlet port is connected to said discharge port, or to a first operating position in which said first supply port is connected to said inlet port, or to a second operating position in which said second supply port is connected to said inlet port; means for moving said valve means from said neutral position to either said first or second operating positions; hydraulic means for automatically starting the return of said valve means from said first operating position to said neutral position upon a predetermined rise in fluid pressure in said first supply port, and from said second operating position to said neutral position upon a predetermined rise in fluid pressure in said second supply port; and supplementary hydraulic means operatively connected to said valve means for accelerating said movement of said valve means from either of said operating positions to said neutral position.

5. In a valve device for a hydraulic system, the combination of: a valve housing; inlet port means in said housing adapted to be connected to a source of fluid under relatively high pressure; discharge port means in said housing adapted to be connected to a point of discharge at relatively low pressure; a supply port in said housing; movable valve means in said housing which is movable to a neutral position in which said inlet port is connected to said discharge port, or to an operating position in which said supply port is connected to said inlet port; means for moving said valve means from said neutral position to said operating position; piston means operatively connected to said valve means; main passage means communicating between one end of said piston and said supply port; an auxiliary valve in said main passage adapted to open in response to a predetermined rise in fluid pressure in said supply port to permit fluid to flow from said supply port to said one end of said piston to move the same together with said valve means from said operating position toward said neutral position; and an auxiliary passage adapted to communicate between said inlet port and said one end of said piston when said piston has moved to a position intermediate between said operating position and said neutral position.

6. In a valve device for a hydraulic system, the combination of: a valve housing; inlet port means in said housing adapted to be connected to a source of fluid under relatively high pressure; discharge port means in said housing adapted to be connected to a point of discharge at relatively low pressure; a supply port in said housing; movable valve means in said housing which is movable to a neutral position in which said inlet port is connected to said discharge port, or to an operating position in which said supply port is connected to said inlet port; means for moving said valve means from said neutral position to said operating position; piston means operatively connected to said valve means; main passage means communicating between one end of said piston and said supply port; an auxiliary valve in said main passage adapted to open in response to a predetermined rise in fluid pressure in said supply port to permit fluid to flow from said supply port to said one end of said piston to move the same together with said valve means from said operating position toward said neutral position; an auxiliary passage adapted to communicate between said inlet port and said one end of said piston when said piston has moved to a position intermediate between said operating position and said neutral position; a bleeder passage communicating between said main passage and said discharge port; and a bleeder valve in said bleeder passage adapted to throttle fluid flow therethrough.

7. In a valve device for a hydraulic system, the combination of: a valve housing having a longitudinal bore therein, an inlet port in said housing communicating with said bore, a discharge port in said housing communicating with said bore, and a supply port in said housing communicating with said bore; cylindrical piston means in said bore and having a main fluid passage therein, said piston means being axially movable in said bore between a neutral position in which said main fluid passage connects said inlet port and said discharge port and an operating position in which said main fluid passage connects said inlet port and said supply port; means for axially moving said piston means from said neutral position to said operating position; primary hydraulic means for automatically starting the return movement of said piston means from said operating position to said neutral position; and secondary hydraulic means for assisting in the movement of said piston means from said operating position to said neutral position.

8. In a valve device for a hydraulic system, the combination of: a valve housing having a longitudinal bore therein, an inlet port in said housing communicating with said bore, a discharge port in said housing communicating with said bore, and a supply port in said housing communicating with said bore; cylindrical piston means in said bore and having a main fluid passage therein, said piston means being axially movable in said bore between a neutral position in which said main fluid passage connects said inlet port and said discharge port and an operating position in which said main fluid passage connects said inlet port and said supply port; rod means operatively connected to said piston means and extending out of said housing; spring means connected to said rod means for accelerating movement of said rod means and said piston means when said piston means moves between said operating position and said neutral position; primary hydraulic means for automatically starting return movement of said piston means from said operating position toward said neutral position upon a predetermined rise in fluid pressure in said supply port; and secondary hydraulic means for completing the movement of said piston means from said operating position to said neutral position.

9. In a valve device for a hydraulic system, the combination of: a valve housing having a longitudinal bore therein, an inlet port in said housing communicating with said bore, a discharge port in said housing communicating with said bore, and a supply port in said housing communicating with said bore; cylindrical piston means in said bore and having a main fluid passage therein, said piston means being axially movable in said bore between a neutral position in which said main fluid passage connects said inlet port and said discharge port and an operating position in which said main fluid passage connects said inlet port and said supply port; means for moving said piston means from said neutral position to said operating position; means for starting the return movement of said piston means from said operating position to said neutral position; and hydraulic means operable in response to movement of said piston means, as said piston means moving from said operating position approaches a point at which said main fluid passage is about to move out of registry with said supply port, to continue the movement of said piston means toward said neutral position until said main fluid passage moves out of registry with said supply port.

10. In a valve device for a hydraulic system, the combination of: a valve housing having a longitudinal bore therein, an inlet port in said housing communicating with said bore, a discharge port in said housing communicating with said bore, and a supply port in said housing communicating with said bore; cylindrical piston means in said bore and having a main fluid passage therein, said piston means being axially movable in said bore between a neutral position in which said main fluid passage connects said inlet port and said discharge port and an operating position in which said main fluid passage connects said inlet port and said supply port; means for moving said piston means from said neutral position to said operating position; means for starting the return movement of said piston means from said operating position to said neutral position; and passage means in said piston adapted to open fluid communication between said inlet port and one end of said piston means as said piston means moving from said operating position approaches a point at which said main fluid passage is about to move out of registry with said supply port.

11. In a valve device, the combination of: a valve housing having a longitudinal bore therein, and having an inlet port and a supply port each communicating with said bore; piston means in said bore and having a main fluid passage therein, said piston means being axially movable in said bore between a neutral position in which said main fluid passage is out of registry with said supply port and an operating position in which said main fluid passage connects said inlet port and said supply port; means for moving said piston means from said neutral position to said operating position; means for starting the return movement of said piston means from said operating position to said neutral position; and passage means adapted to connect said inlet port and one end of said piston means in response to movement of said piston means from said operating position toward said neutral position.

12. In a valve device, the combination of: a valve housing having a longitudinal bore therein, and having an inlet port and a supply port each communicating with said bore; piston means in said bore and having a main fluid passage therein, said piston means being axially movable in said bore between a neutral position in which said main fluid passage is out of registry with said supply port and an operating position in which said main fluid passage connects said inlet port and said supply port; means for moving said piston means from said neutral position to said operating position; means for starting the return movement of said piston means from said operating position to said neutral position; and passage means adapted to connect said inlet port and one end of said piston means in response to movement of said piston means from said operating position toward said neutral position, said passage means including a fluid passage in said piston means communicating with said main fluid passage and adapted to register with a fluid port communicating with said end of said piston means.

13. In a valve device, the combination of: a valve housing having a longitudinal bore therein, and having an inlet port, a first supply port, and a second supply port, each communicating with said bore; piston means in said bore and having a main fluid passage therein, said piston means being axially movable in said bore from a neutral position in which said main fluid passage is out of registry with said supply ports to a first operating position in which said main fluid passage connects said inlet port and said first supply port, or from said neutral position to a second operating position in which said main fluid passage connects said inlet port and said second supply port; means for selectively moving said piston means from said neutral position to either said first or second operating position; means for starting the return movement of said piston means from said operating positions toward said neutral position; first passage means adapted to connect said inlet port with one end of said piston means in response to movement of said piston means from said first operating position toward said neutral position; and second passage means adapted to connect said inlet port with the other end of said piston means in response to movement of said piston means from said second operating position toward said neutral position.

RODNEY B. CAMPBELL.